United States Patent
Gibson et al.

(10) Patent No.: US 8,148,963 B2
(45) Date of Patent: Apr. 3, 2012

(54) SELF-OSCILLATING CONVERTER

(75) Inventors: Neil Gibson, Freising (DE); Kevin Scoones, Munich (DE)

(73) Assignee: Texas Instruments Deutschland GmbH, Freising (DE)

( * ) Notice: Subject to any disclaimer, the term of this patent is extended or adjusted under 35 U.S.C. 154(b) by 815 days.

(21) Appl. No.: 12/190,730

(22) Filed: Aug. 13, 2008

(65) Prior Publication Data

US 2009/0058375 A1    Mar. 5, 2009

Related U.S. Application Data

(63) Continuation-in-part of application No. 11/695,876, filed on Apr. 3, 2007, now Pat. No. 7,902,805.

(60) Provisional application No. 61/016,758, filed on Dec. 26, 2007, provisional application No. 60/882,452, filed on Dec. 28, 2006.

(30) Foreign Application Priority Data

Apr. 3, 2006 (DE) .......................... 10 2006 015 339
Aug. 13, 2007 (DE) .......................... 10 2007 038 181

(51) Int. Cl.
G05F 1/00 (2006.01)
(52) U.S. Cl. .......................... 323/282; 323/285; 323/345

(58) Field of Classification Search .................. 323/222, 323/271, 282–286, 345
See application file for complete search history.

(56) References Cited

U.S. PATENT DOCUMENTS

| | | | |
|---|---|---|---|
| 5,600,234 A * | 2/1997 | Hastings et al. | 323/282 |
| 6,147,478 A | 11/2000 | Skelton et al. | |
| 7,170,273 B2 * | 1/2007 | Sase et al. | 323/285 |
| 2004/0004470 A1 * | 1/2004 | Yoshida et al. | 323/284 |
| 2004/0104713 A1 * | 6/2004 | Mariani et al. | 323/282 |
| 2005/0127881 A1 | 6/2005 | Sase et al. | |

FOREIGN PATENT DOCUMENTS

DE        102006015339        4/2006

* cited by examiner

*Primary Examiner* — Adolf Berhane
*Assistant Examiner* — Nguyen Tran
(74) *Attorney, Agent, or Firm* — William B. Kempler; Wade J. Brady III; Frederick J. Telecky, Jr.

(57) ABSTRACT

A converter has a main feedback path and two auxiliary feedback paths from an output node to an auxiliary differential input pair of a comparator. The auxiliary feedback paths have different RC time constants so that a differential ramp signal is effectively applied to the auxiliary differential inputs of the comparator. The circuit design compensates for a negligibly small equivalent series resistor of an output capacitor so that modern capacitors may be used without compromising the stable oscillation of the converter.

9 Claims, 1 Drawing Sheet

SELF-OSCILLATING CONVERTER

This patent application claims priority from German Patent Application No. 10 2007 038 181.8, filed 13 Aug. 2007, and from U.S. Provisional Patent Application No. 61/016,758, filed 26 Dec. 2007, the entireties of which are incorporated herein by reference. This application is a continuation-in-part of U.S. application Ser. No. 11/695,876, filed 3 Apr. 2007, which claims priority from German Patent Application No. 10 2006 015 339.1, filed 3 Apr. 2006, and from U.S. Provisional Application No. 60/882,452, filed 28 Dec. 2006.

FIELD OF THE INVENTION

The invention relates to a self-oscillating converter that includes a load capacitor with a negligibly small equivalent series resistor and a feedback loop with a comparator to which a voltage difference between a reference voltage and an output voltage of the converter is applied.

BACKGROUND

Self-oscillating converters typically depend upon the equivalent series resistance (ESR) of the output or load capacitor for their operation. Modern capacitors, such as, for example, small high-frequency ceramic thin film capacitors, have a negligible ESR. Then, an external resistance is needed. But the external resistance leads to a higher output ripple waveform of the output voltage.

With no or too small an equivalent series resistance, the oscillator becomes unstable or only conditionally stable with, for example, more than one stable oscillation frequency.

SUMMARY

The invention provides a converter in a circuit design that compensates for a negligibly small equivalent series resistor of an output capacitor. Thus, modern capacitors may be used without compromising the stable oscillation of the converter.

In one embodiment, the inventive converter comprises a first auxiliary feedback path from an output node to a first differential input of the comparator and a second auxiliary feedback path from the output node to a second differential input of the comparator. The first auxiliary feedback path has a first RC time constant and the second auxiliary feedback path has a second RC time constant different from the first time constant. The differential voltage between the first and second differential inputs is added to the voltage difference applied to the comparator. The two auxiliary feedback paths are preferably connected to a differential input pair of the comparator. An auxiliary ramp is generated with the differential time constant and is fed into the auxiliary pair of inputs of the summing comparator. This mechanism effectively adds a ramp to the usual feedback path of the converter. As the auxiliary ramp is differential, there is no series resistance added to the converter's output resistance. Or, in other words, there is no DC component.

The invention allows the use of modern capacitors that have a negligibly small equivalent series resistor without compromising the stability of oscillation.

BRIEF DESCRIPTION OF THE DRAWINGS

Further features and advantages of the invention will be apparent from the following description of example embodiments, with reference to the accompanying drawings, wherein.

DETAILED DESCRIPTION OF EXAMPLE EMBODIMENTS

Figure 1:
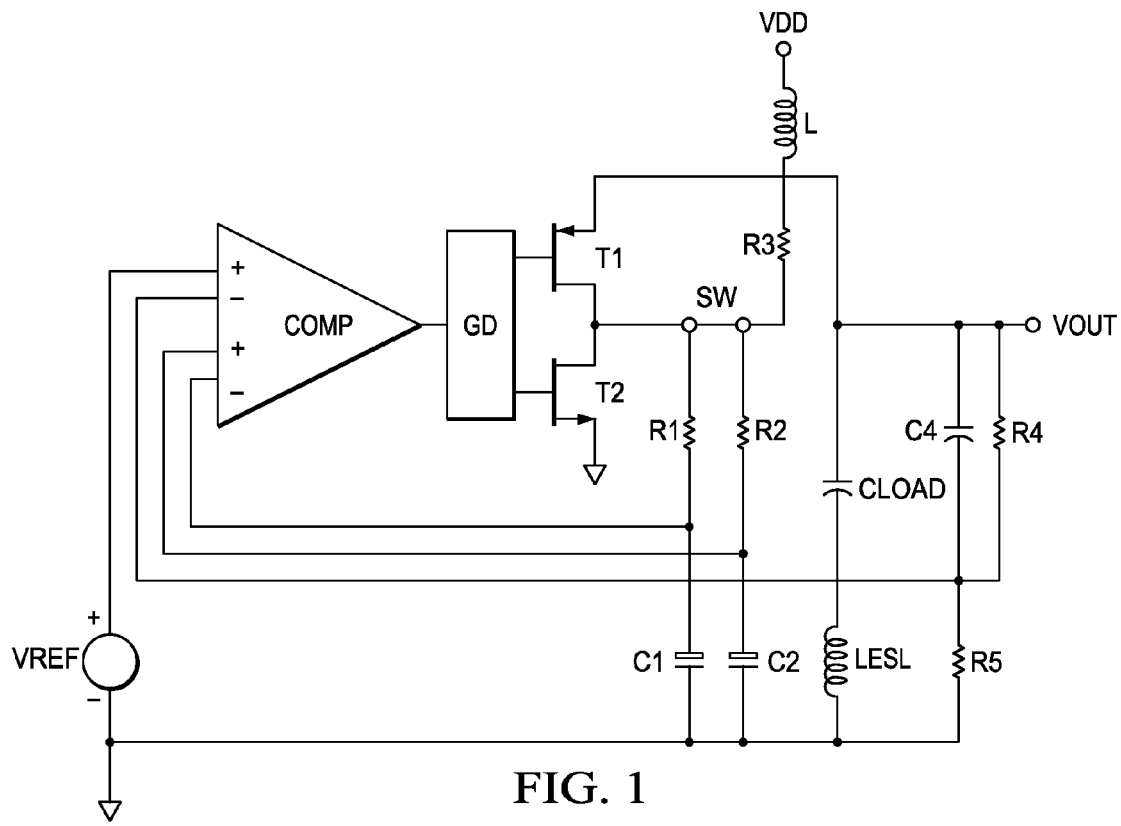
FIG. 1 shows a schematic of an inventive boost converter.

FIG. 1 shows a schematic of an inventive boost converter with the elements necessary to understand the invention. Comparator COMP is a high gain summing comparator with two differential input pairs. The output of the comparator COMP is connected to a gate driver unit GD driving a pair of MOS transistors T1 and T2 interconnected at their drains. The source of one of the MOS transistors is connected to ground and the source of the other MOS transistor is connected to the output Vout. The interconnection point between the two transistors T1 and T2 is a node SW. Node SW is connected via a resistor R3 and an inductor L to a voltage supply VDD. The non-inverting input of the first differential input pair is connected to a reference voltage source Vref. The inverting input of the first differential input pair is connected via a resistor R4 and a parallel capacitor C4 to the output Vout and via a resistor R5 to ground. Resistors R4 and R5 together with C4 constitute a filter network of a main feedback path. Two RC series combinations are connected between node SW and ground. The first RC combination has resistor R1 and capacitor C1 which define a first time constant Tau1 equal to R1*C1. The second RC combination has resistor R2 and capacitor C2 which define a second time constant Tau2 equal to R2*C2. The interconnection nodes of the RC combinations are coupled to the second differential input pair of the comparator, thereby providing two auxiliary feedback paths. Each RC combination produces a ramp signal. Since the time constants Tau1 and Tau2 are different, a differential ramp signal is effectively applied to the second differential input pair of the comparator COMP. A capacitor Cload is connected between the output Vout and ground via an inductor Lesl which is the equivalent series inductor of the capacitor. The capacitor Cload is a capacitor with a negligibly small equivalent series resistance ESR.

Figure 2:
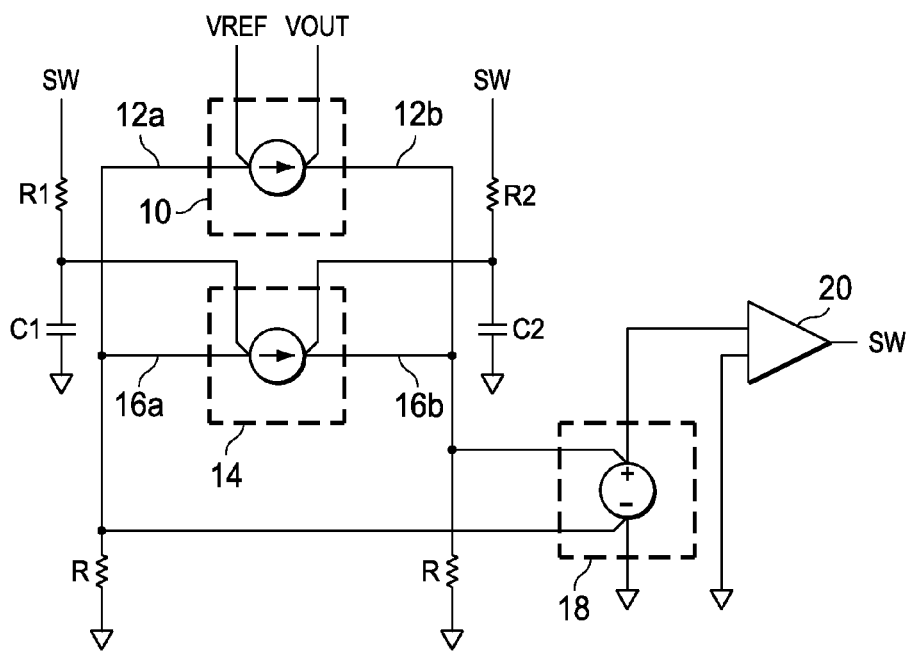
FIG. 2 shows a possible implementation of the summing comparator together with the additional feedback paths.

In FIG. 2, a first block 10 represents a differential amplifier with a first input connected to the reference voltage Vref and a second input connected to the output voltage Vout. Block 10 corresponds to the first differential input pair of the summing comparator COMP of FIG. 1 and has differential outputs 12a, 12b. A block 14 represents a further differential amplifier with inputs connected to the nodes of the RC combinations R1/C1 and R2/C2 and differential outputs 16a, 16b. The inputs to block 14 correspond to the second differential input pair of the summing comparator COMP. Outputs 12a and 16a are interconnected and connected to ground via a resistor R, as likewise are outputs 12b and 16b. The voltage difference between the interconnected differential outputs is symbolized in FIG. 2 by a block 18 and is applied to the inputs of a comparator 20. The output of comparator 20 corresponds to node SW in FIG. 1.

At the first differential amplifier 10 a voltage difference between the reference voltage and the output voltage is amplified and fed to the comparator 20 as usual. With the two auxiliary feedback paths from the output of the comparator, i.e. the first auxiliary feedback path with R1 and C1 and the second auxiliary feedback path with R2 and C2, a voltage difference between the two voltage ramps of the auxiliary feedback paths is added to the voltage difference Vref−Vout. As the time constants Tau1 and Tau2 of the two feedback paths are different the difference voltage over time is also a voltage ramp. Since only the voltage difference between the two auxiliary feedback paths is used, no DC component is introduced.

The behavior of a self-oscillating converter using the inventive feedback paths is much the same as the behavior of a self-oscillating converter with a load capacitor that does have an equivalent series resistance. In particular, the oscillation is as stable as it is for a converter with ESR. Advantageously, the load capacitor is a ceramic thin film capacitor.

To change the converter between buck and boost mode it is only necessary to invert the inputs to block 14. In a preferred embodiment, a switch is provided to invert the inputs to block 14 in response to a digital control signal.

The invention is advantageous for both hysteretic and non hysteretic converters.

Those skilled in the art to which the invention relates will appreciate that other and further embodiments are possible within the scope of the claimed invention.

What is claimed is:

1. A self-oscillating converter including a load capacitor with a negligibly small equivalent series resistor and a feedback loop with a comparator to which a voltage difference between a reference voltage and an output voltage of the converter is applied, comprising:
    a first auxiliary feedback path from an switched node to a first input of a first differential input of the comparator, the first auxiliary feedback path having a first RC time constant;
    a second auxiliary feedback path from the switched node to a second input of the first differential input of the comparator, the second auxiliary feedback path having a second RC time constant different from the first time constant; and
    circuitry for adding a differential voltage between the first and second differential inputs to the voltage difference applied to the comparator for generating a voltage equivalent to a voltage that would have been generated across the equivalent series resistance of the load capacitor had the equivalent series resistance not been negligible.

2. The converter of claim 1, wherein each of the first and second auxiliary feedback paths comprises a resistor and a capacitor connected in series to ground.

3. The converter of claim 2, further comprising a switching unit which, in response to a logic buck/boost control signal, inverts the first and second differential inputs relative to applied differential voltage.

4. The converter of claim 2, wherein the comparator has two differential input pairs, a first pair being used with the feedback loop and a second pair being used with the first and second auxiliary feedback paths.

5. The converter of claim 4, further comprising a switching unit which, in response to a logic buck/boost control signal, inverts the first and second differential inputs relative to applied differential voltage.

6. The converter of claim 5, wherein the load capacitor is a ceramic thin film capacitor.

7. The converter of claim 1, wherein the comparator has two differential input pairs, a first pair being used with the feedback loop and a second pair being used with the first and second auxiliary feedback paths.

8. The converter of claim 1, further comprising a switching unit which, in response to a logic buck/boost control signal, inverts the first and second differential inputs relative to applied differential voltage.

9. The converter of claim 1, wherein the load capacitor is a ceramic thin film capacitor.

* * * * *